Sept. 3, 1963 J. E. KUNZLER 3,102,973

SUPERCONDUCTING DEVICE

Filed June 26, 1961 2 Sheets-Sheet 1

INVENTOR
J. E. KUNZLER
BY George S. Indig
ATTORNEY

INVENTOR
J. E. KUNZLER
BY George S. Indig
ATTORNEY

United States Patent Office 3,102,973
Patented Sept. 3, 1963

3,102,973
SUPERCONDUCTING DEVICE

John E. Kunzler, Pleasant Grove, N.J., assignor to Bell Telephone Laboratories, Incorporated, New York, N.Y., a corporation of New York Filed June 26, 1961, Ser. No. 119,488
9 Claims. (Cl. 317—158)

Figure 1:
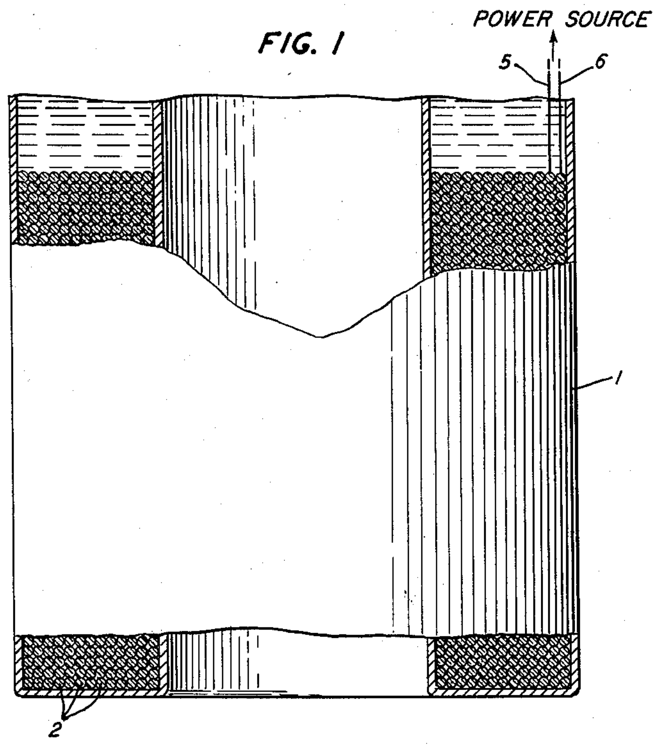

This invention relates to superconducting compositions and more particularly to certain bismuth-lead alloys, as well as to devices utilizing such alloys as the active superconducting medium.

Although the phenomenon of superconductivity has been recognized for some years, and although it has been observed in a wide range of materials, useful devices based on this mechanism have been slow in developing. Although much of the delay can be attributed to practical considerations, such as the difficulty of attaining the necessary low temperatures, material limitations have played an important part. Most contemplated uses of superconducting elements require the flow of fairly large currents, and many are dependent upon the creation of a magnetic field of some magnitude.

It is known that the effectiveness of a given material in such uses is limited, inter alia, by parameters which have come to be designated as critical current and critical field. These values, which are interrelated, are defined as the maximum current and field values which can be tolerated by the medium in its superconducting state. Exceeding either maximum results in the breakdown of the material into its normal state and results in a finite resistance. The two quantities are interrelated, the highest value of critical field corresponding with zero critical current and the highest value of critical current corresponding with the lowest value of critical field.

Most contemplated devices utilizing a superconducting element involve one or more wire configurations. Such configurations may take the form of single or multiple straight strands, or for many magnetic applications may assume the form of one or more coils, as in an ordinary solenoid. Cryogenic equipment and techniques are now developed to a point where superconducting solenoids capable of tolerating current densities in the order of 1100 amps./cm.$^2$ and higher and field strengths of 5K gauss and higher in their superconducting state are economically competitive with the more conventional solenoids.

Additionally, superconducting elements have recently been found to be of value in the field of magnetic shielding where the magnetic insulating properties of such elements are utilized in a magnetic circuit to prevent loss of flux and fringing. Such shielding is typically utilized in masers and other low temperature devices requiring magnetic fields of high intensity and uniformity over an extended region. As is well known, the magnetic field between two poles is ordinarily characterized by nonuniformity due principally to leakage and fringing of the flux near the gap. In the past the required uniformity of magnetic field has been achieved by utilizing only a small portion of the field developed over an air gap of much larger cross section. The size of the gap required has necessitated the use of large power consuming electromagnets which have serious drawbacks when utilized within a cryostat. Accordingly, in accordance with the invention described at length in copending U.S. application Serial No. 52,393, filed August 29, 1960, by P. P. Cioffi, it was determined that the size and weight of such magnets may be considerably reduced by surrounding the air gap volume between pole pieces of the magnet with a superconducting material in a magnetic insulating condition. Leakage and fringing of flux between the pole pieces is thereby eliminated and the magnet is required to develop flux only across the useful gap. Typically such a superconducting insulating member takes the form of a coil or hollow cylindrical element surrounding the air gap.

Unfortunately, it has been the experience of workers in the art that in general those superconducting materials having the requisite physical properties for permitting such operations as drawing, winding and the like, are limited by having low values of critical field and/or critical current, while those materials possessing appropriate superconducting property are extremely brittle and unworkable by ordinary fabricating techniques.

In an effort to develop a range of usable superconducting materials meeting the above requirements, the art, some years ago, investigated the superconducting phenomenon associated with the bismuth-led alloy system. Work carried out by W. J. De Haas and J. Voogd, Communication Physics, Laboratory Univ. Leiden, No. 208B, 1930, determined that the eutectic composition of this alloy consists of a mixture of a solid solution of approximately 10 percent lead in bismuth and a solid solution of approximately 33 percent bismuth in lead. From a superconducting standpoint, it was determined that the 33 percent bismuth-67 percent lead solid solution is the preferred composition since it is the composition that first becomes superconducting and then short circuits the resistance of the whole eutectic mixture. Critical field measurements of this solid solution led to the conclusion that if a solenoid were made of a solid solution of 33 percent bismuth-67 percent lead, it should be possible to generate magnetic fields in the order of 19K gauss at 2° K. No current density measurements were made on this material, however. Subsequent work by D. Schoenberg, "Superconductivity," 1932 edition, pages 39 and 40, confirmed the findings of De Haas as regards the critical fields exhibited by the 33 percent bismuth-67 percent lead composition. Unfortunately, current density measurements made on this composition by De Haas led to the conclusion that the critical current value of this composition is so low as to preclude its use as a superconducting solenoid. More recent work by Ruhemann and Ruhemann reported in "Low Temperature Physics," 1937 edition, pages 275 and 288, also confirms the work of Schoenberg and reiterates the conclusion that the realization of high currents in the 33 percent bismuth-67 percent lead composition and other bismuth-lead compositions are not feasible.

Accordingly, in view of the prohibitively low current densities associated with the bismuth-lead alloy system, investigators in the art have turned to the other materials in an attempt to obtain compositions exhibiting the desirable combination of high current density and high critical field.

In accordance with the present invention it has been determined that a particular restricted area of the bismuth-lead alloy system in fact, tolerates a large critical current and a large critical field without reverting to its normal state. In particular, it has been determined that a bismuth-lead alloy of the composition $Bi_{43-54}Pb_{57-46}$, expressed in weight percent, sustains a current density of at least 1400 amps./cm.$^2$ in a field of 18K gauss. Additionally, the material is very ductile, thereby lending itself to such physical operations as drawing, winding, and the like. A further advantage of this material is its relative cheapness as compared to other known superconducting materials.

Figure 2:
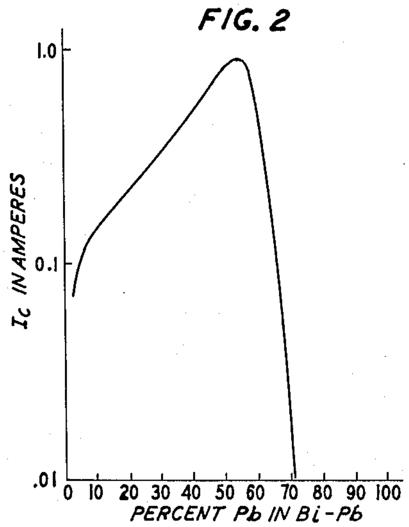
Figure 3A:
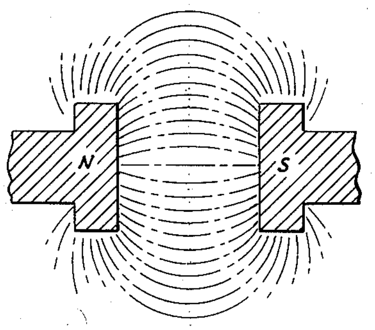
Figure 3B:
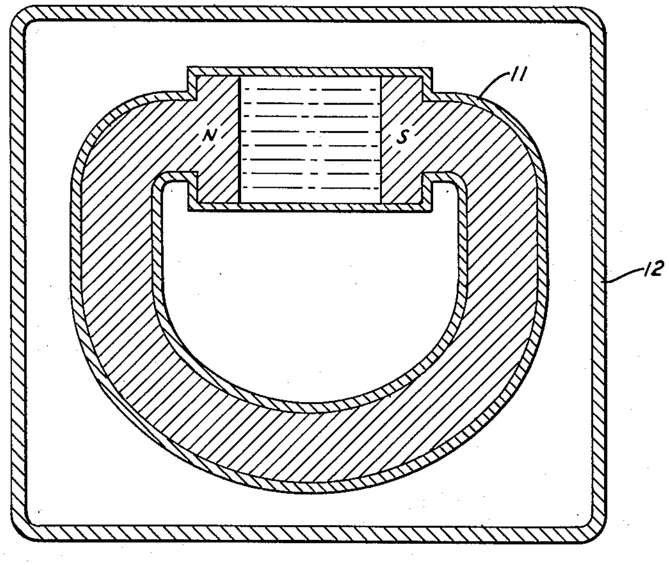

An understanding of the invention is facilitated by reference to the drawing, in which:

FIG. 1 is a sectional view of a magnet configuration consisting of an annular cryostat containing several windings of the bismuth-lead composition of the instant invention;

FIG. 2, on coordinates of critical current versus composition, is a semi-log plot showing the effect of increasing amounts of lead in the bismuth-lead alloy system on the critical current exhibited by one bulk sample of bismuth-lead;

FIG. 3A is a cross-sectional view of poles of a magnet showing the magnetic field between the poles of a magnet under ordinary conditions; and FIG. 3B is a cross-sectional view of poles of a magnet showing the field in a magnetic circuit arrangement in a low temperature cryostat utilizing superconducting shielding.

Referring more specifically to FIG. 1, there is shown an annular cryostat 1 of the approximate dimensions of 18" O.D. x 10" I.D. x 30" long, filled with liquid helium and containing 3000 turns per centimeter length of windings 2 formed of the composition of the instant invention. Terminal leads 5 and 6 are shown emerging from the coil. A pumping means, not shown, is attached to the cryostat so as to permit a temperature in the range corresponding with the range of boiling points for different pressures.

The pumping means used in the experimental work described herein permits regulation of temperature between the values of 1.5° K. and 4.2° K., corresponding with a pressure range of 3.6 millimeters of mercury and atmospheric pressure.

The values set forth in FIG. 2 were made on 10 mil diameter wire at a temperature of 1.5° K. in a magnetic field of 18K gauss. The materials upon which measurements were made had the compositions noted on the abscissa, each specimen having a length of about 2 centimeters. The experimental work resulting in the measured values depicted in FIG. 2 made use of a direct-current supply source in series with one or more variable resistors. By this means it was possible to vary the current flowing through the superconducting specimen, and by also adjusting the applied field to so determine the relationship between critical current and current field. It is to be noted that in actual operation a solenoid structure such as that shown in FIG. 1 may avoid resistance losses and so obviate the need for a continuous direct-current source by using an arrangement for shunting the current. Such arrangements are considered well known in the art, conventional circuits as well as certain novel arrangements all usable in conjunction with the instant invention being described at some length in copending U.S. application Serial No. 56,748, filed September 19, 1960, by J. E. Kunzler. Each of the two techniques has its advantages. Where the magnetic field is to be varied during operation, it is necessary to use a continuous direct-current source together with a variable resistor or some other adjusting means. Where the requirement is for a constant field, optimum efficiency is obtained by use of a shunt. Where extremely high current densities are to be used, it may be unfeasible to use a continuous source and other exposed circuitry by reason of the large heat losses. Additionally, in that embodiment depicted in FIG. 1, the gap between the coils can be maintained at either room or elevated temperature. This permits the magnetic field of the coil to act on bodies placed in the gap that are maintained at elevated temperatures in comparison to the low temperature environment of the coils.

The effect of lead concentration on the critical current characteristic of the material of the instant invention is shown in FIG. 2. In this figure the ordinate measures the logarithm of the critical current value, with the abscissa indicating the lead concentration on a weight percent basis of the material. As seen from FIG. 2, a 10 mil bismuth-lead wire of the composition $Bi_{43-54}Pb_{46-57}$ in a magnetic field of 18K gauss tolerates a critical current of at least 0.7 ampere corresponding to a current density of at least 1400 amps./cm.$^2$. Compositions outside of this limited range exhibit a marked decrease in current density. This combination of critical current and critical field makes the composition of value for many of the contemplated uses of superconducting devices.

As previously discussed, many contemplated superconducting devices assume the form of one or more coils as depicted in FIG. 1. The field strength exhibited by such a configuration is dependent upon the number of coils times the number of windings per coil times the amperes flowing through the coil. To obtain maximum field strength, it is desirable to maintain a current in the coils such that each coil has associated with it a field approximating its critical field. In such a configuration consisting of several concentric coils, the critical current is limited by the field acting in the innermost coil. This field is composed of the field induced by the current flowing through the coil and the internal field of the magnet. Thus, the action of the magnetic field on the electromagnet is strongest on the inner coils and weakest on the outer coils. Assuming that a typical electromagnet exhibits a field strength of approximately 18K gauss on the inner coil, reference to FIG. 2 shows that the maximum current density tolerable in an inner coil formed of the prior art 33 percent bismuth-67 percent lead composition without destroying superconductivity is 64 amps./cm.$^2$ corresponding to a plotted critical current of 0.032 ampere. Since in a series arrangement the same current flows through all coils, this is the current flowing through the outer coils also. However, since the magnetic field acting on the outer coils is less than 18K gauss, it is apparent that the outer coils can tolerate a larger current density and still remain superconducting.

Substitution of the composition of the instant invention for the prior art composition results in a significant increase in the field strength exhibited by the above described superconducting magnet. As seen in FIG. 2, the minimum tolerable current density of the instant composition in a field of 18K gauss is 1400 amps./cm.$^2$, an increase of 1336 amps./cm.$^2$ over the prior art composition. Such an increase in current density permits the attainment of higher fields than heretofore permissible in superconducting magnets utilizing the prior art bismuth-lead composition.

Based on FIG. 2, a preferred composition of the instant invention is $Bi_{44-52}Pb_{48-56}$, with an optimum composition being $Bi_{46-50}Pb_{50-54}$. These compositions in a field of 18K gauss tolerate minimum critical currents of 0.8 ampere and 0.86 ampere, respectively, corresponding to current densities of 1600 amps./cm.$^2$ and 1720 amps./cm.$^2$, respectively. Since, as previously noted, the critical current and critical field parameters are interrelated, lowering the field acting on the compositions increases the current densities the compositions can sustain. For example, it has been determined that a composition of the invention capable of sustaining 1400 amps./cm.$^2$ in a field of 18K gauss tolerates approximately 5000 amps./cm.$^2$ in a field of 8K gauss.

As further seen from FIG. 2, the critical currents associated with the prior art 33 percent bismuth-67 percent lead composition and the 43.6 percent lead-56.4 percent bismuth eutectic composition in a field of 18K gauss are 0.032 ampere and 0.68 ampere, respectively, corresponding to current densities of 64 amps./cm.$^2$ and 1360 amps./cm.$^2$ respectively. In contrast, and as previously discussed, investigators in the art had heretofore concluded that the 33 percent bismuth-67 percent lead composition was superior to the eutectic composition since the eutectic contains a second phase of 10 percent lead-90 percent bismuth. As evidenced by FIG. 2, however, this second phase in fact enhances the superconducting properties of the eutectic composition.

Based on the art's erroneous conclusion that the 33 percent bismuth-67 percent lead composition is the preferred composition of the bismuth-lead system, it is evident from FIG. 2 why the art concluded that the critical current values associated with the bismuth-lead system in general and those compositions lying between the eutectic composition and the preferred composition, in particular, are so low as to preclude their use as superconducting solenoids. The 64 amps./cm.$^2$ current density value of the preferred composition in a field of 18K gauss precludes its use in economically competitive superconducting devices.

FIG. 3A shows the magnetic field around the gap between plane parallel pole pieces. Under ordinary conditions the lines of flux are bowed outward near the ends of the gap, so that the field is distorted and inhomogeneous. In FIG. 3B it is seen that when the gap is enclosed within a superconducting magnetic insulator member 11 having the composition of the instant invention the flux pattern is uniform. In the apparatus of FIG. 3B, the entire magnetic circuit is contained in cryostat 12 and is maintained at a temperature below the transition temperature of the superconductor.

The embodiment of FIG. 3B is illustrative only of the many forms of insulated magnetic circuits. In typical superconductive insulated magnetic circuits the magnetomotive force is supplied by an electromagnetic which is energized after the superconductive magnetic insulator member has been cooled below its transition temperature. In general, the only requirement is that at least the air gap between the pole pieces of the electromagnet is insulated by the superconductive member. Ordinary conductive energizing coils may be utilized in such a circuit, or, alternatively, superconductive windings which also act as the magnetic insulating member for the air gap may be used. When ordinary conductive energizing coils are utilized, the air gap is substantially enclosed by a superconductive member which may be in the form of a hollow cylinder or coil.

In operation, the low temperature device requiring the developed magnetic field is placed in the gap between the pole pieces of the electromagnet and the entire assembly then cooled in a cryostat to a temperature below the transition temperature of the superconductive insulator member. For example, the air gap may contain a maser comprising a resonant cavity loaded with a paramagnetic resonant medium and means for coupling wave energy to the cavity.

Because of its malleability, bismuth-lead compositions are readily fabricated into wires by the cold extrusion process, wherein a bismuth-lead ingot of the desired composition is cold extruded in the form of a wire. Such extrusion is capable of forming 10 mil diameter wire, which is within the range of typical sizes utilized in solenoid windings. After such cold extrusion, the wire is then wound into a coil by conventional techniques and is ready to be utilized as, for example, a superconducting solenoid. Smaller diameter wires are readily formed, if desired, by subsequent cold drawing steps to achieve the final desired diameter. In general, all cold drawing processes are the same in that the wire is physically drawn in a series of steps to a smaller diameter. The machinery available for such cold drawing dictates that such drawing must be done in an increment of several steps, each step reducing the diameter until the final diameter is achieved.

Of necessity, the invention is described in a limited number of embodiments. Alternative embodiments readily apparent to those skilled in the art are intended to be within the scope of the appended claims.

What is claimed is:

1. A superconducting device comprising a superconducting bismuth-lead member, means for energizing said member to induce a current having a minimum current density of 1400 amps./cm.$^2$ in said member and cooling means for maintaining said member at a temperature below its transition temperature, said member having the following composition on a percent by weight basis: $Bi_{43-54}Pb_{46-57}$.

2. A device in accordance with claim 1 wherein the composition is $Bi_{44-52}Pb_{48-56}$.

3. A device in accordance with claim 1 wherein the composition is $Bi_{46-50}Pb_{50-54}$.

4. A superconducting solenoid including a superconducting wire member having the following composition on a percent by weight basis $Bi_{43-54}Pb_{46-57}$, and leads connecting said wire member with a power source to induce a current having a minimum current density of 1400 amps./cm.$^2$ in said member together with means sufficient to reduce the temperature of said wire member to a temperature below its critical temperature.

5. A device in accordance with claim 4 wherein the composition is $Bi_{44-52}Pb_{48-56}$.

6. A device in accordance with claim 4 wherein the composition is $Bi_{46-50}Pb_{50-54}$.

7. A magnetic circuit including an electromagnet having pole pieces separated by an air gap, a superconducting magnetic insulator member substantially enclosing at least that portion of the magnetic circuit comprising the air gap, means sufficient to reduce the temperature of said member to a temperature below its transition temperature, and means for energizing said electromagnet inducing a current having a minimum current density of 1400 amps./cm.$^2$ in said member, said member having the following composition on a percent by weight basis: $Bi_{43-54}Pb_{46-57}$.

8. A magnetic circuit in accordance with claim 7 wherein the composition is $Bi_{44-52}Pb_{48-56}$.

9. A magnetic circuit in accordance with claim 7 wherein the composition is $Bi_{46-50}Pb_{50-54}$.

References Cited in the file of this patent

UNITED STATES PATENTS 2,866,842 Matthias _______________ Dec. 30, 1958

OTHER REFERENCES

Autler: "Superconducting Electromagnets," The Review of Scientific Instruments, vol. 31, No. 4, pp. 369–373.

Burton: "Superconductivity," Toronto Press, Toronto, Canada, 1934, pp. 53–58.